April 30, 1940.                    E. C. LEIBIG ET AL                    2,198,733
                                  TREATING GLASS ARTICLES
                                    Filed Dec. 19, 1936
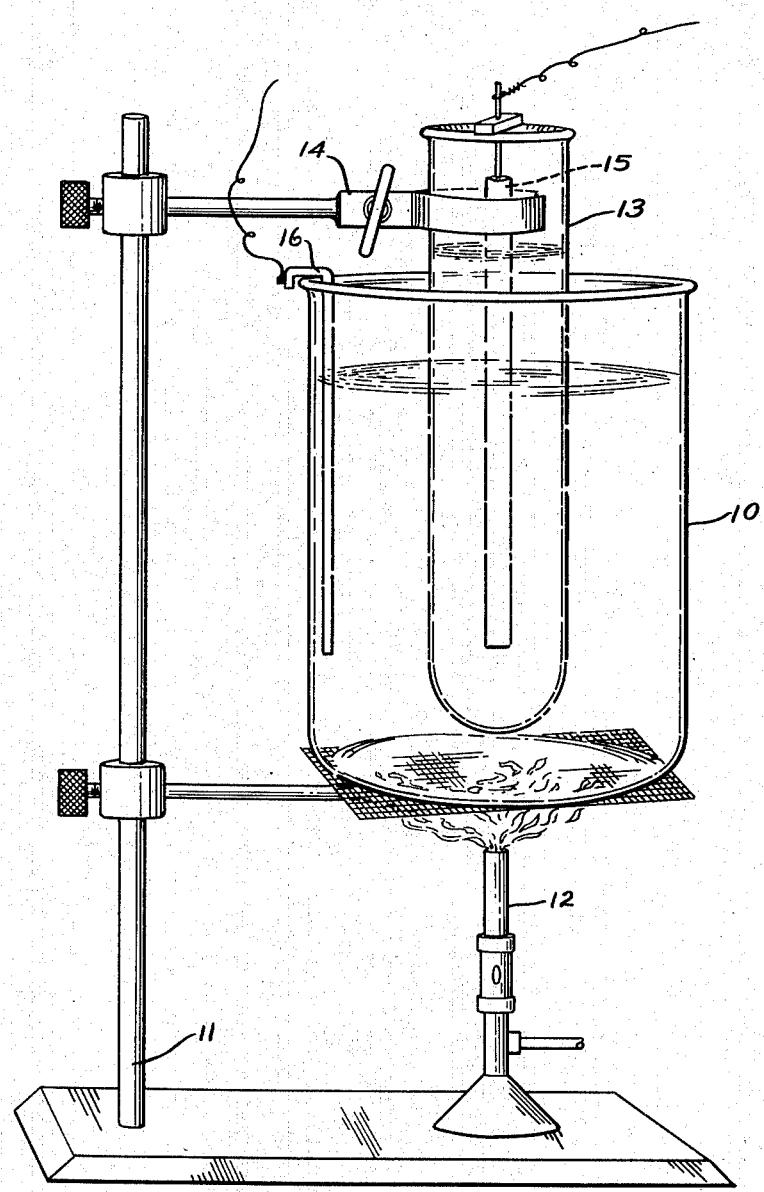
INVENTORS.
EDWARD C. LEIBIG AND
JAMES FRANKLYN HYDE
BY Dorsey & Cole
ATTORNEYS.

Patented Apr. 30, 1940

2,198,733

UNITED STATES PATENT OFFICE 2,198,733

TREATING GLASS ARTICLES

Edward Charles Leibig, Wellsboro, Pa., and James Franklin Hyde, Corning, N. Y., assignors to Corning Glass Works, Corning, N. Y., a corporation of New York Application December 19, 1936, Serial No. 116,826

6 Claims. (Cl. 204—19)

This invention relates to glass and has for its primary object to modify the composition and properties of a glass article after fabrication.

Another object of the invention is to produce transparent vitreous glass articles of novel compositions which cannot be produced by melting a batch of the corresponding composition in the usual manner.

The above and other objects may be accomplished by practicing our invention which embodies among its features passing an electrical energy through the glass from an electrolyte in contact therewith consisting of a molten salt containing ions of a metal of the first periodic group, the glass and the salt being heated to a temperature between the strain point and the softening point of the glass.

The term strain point or strain temperature, as used herein, is that temperature at which the glass has a viscosity of $10^{14.6}$ poises and softening point or softening temperature is the temperature at which the glass has a viscosity of $10^{7.65}$ poises. They are determined preferably by the method described by H. R. Lillie in an article entitled "Viscosity of glass between the strain point and melting temperature," Jour. Am. Cer. Soc., vol. 14, pages 502–511 (1931).

By means of this invention the alkali of the glass may be substantially completely replaced with a metal of the first periodic group, that is, the alkali of the glass may be replaced with copper, silver, or with another alkali metal. It is assumed that metallic ions from the molten salt which constitutes the anolyte are carried into the glass by the electric current and the metallic alkali ions of the glass are at the same time removed from the glass and in some instances dispersed in the catholyte which may consist of a molten salt in contact with the glass. Obviously the anolyte and catholyte must be separated from one another by the glass under treatment.

Prior attempts to electrolyze glass have failed because the glass invariably has fractured before the substituted metal ions have penetrated to any appreciable depth therein. We have found that this is caused by the fact that the molecular volumes of the alkali of the glass and the ion which is being substituted therefore are so different that disruptive stresses are set up within the glass and breakage results. We have further found that the strains resulting from such stresses can be eliminated and breakage of the glass can thus be prevented by maintaining the glass at a temperature between its strain point and its softening point during the electrolysis. The best way to accomplish this is to heat the molten salts to the desired temperature in a suitable container in which the glass is immersed.

In order that the invention may more readily be understood, reference is had to the accompanying drawing which illustrates its simplest embodiment but is not intended to limit the invention.

In the drawing a suitable container, such as a beaker 10, is supported on a ring stand 11 over a burner 12. The beaker 10 contains a quantity of a low melting inorganic salt, for example, cuprous chloride which is molten from the heat of the burner. A glass tube 13, supported by the ring stand and a clamp 14, is immersed in the molten salt in the beaker. The tube 13 also contains a quantity of a molten low melting salt of a metal which it is desired to substitute for the alkali in the glass of the tube 13, for example, cuprous chloride. Carbon rods 15 and 16 are suspended so as to dip into the molten salts in the tube 13 and the beaker 10 respectively and are connected to a source of direct electrical current (not shown). The rods 15 and 16 may advantageously be composed of copper.

When the rod 15 is made positive, the current therefrom is conducted by the copper ions of the molten salt to the inner wall of the tube 13 into which the copper ions penetrate. The copper ions remain in the glass and alkali ions emerge from the outside wall of the tube 13 into the molten salt surrounding the tube in the beaker 10 and complete the circuit to the carbon rod 16 which in this case is negative. Although the mobility of the copper ions in the glass is undoubtedly much less than in the molten salt, the deposition of the copper in the glass is assumed to be largely due to the loss of charge from the copper ions and the taking up of such charges by the alkali atoms. In any event the resistance of the glass is greatly increased as the progressive replacement of alkali by copper proceeds. Moreover, the viscosity of the glass is increased by the displacement of the alkali which further slows the migration velocity of the incoming ion. At a temperature of 650° C. and with an electrical pressure of 110 volts, the resistance of a borosilicate glass increased to such an extent that the flow of current decreased from an initial flow of 1.5 amperes to .01 ampere in 25 minutes. This indicates that the copper or substituting metal does not precede the alkali through the glass but follows it and when the alkali has been substantially completely expelled or replaced any further migration of ions through the glass is extremely slow.

When molten silver chloride is substituted for the copper chloride in the tube 13 a similar reaction occurs and the alkali of the glass is substantially completely replaced by silver. In this case the rods 15 and 16 should preferably be composed of silver.

With the tube 13 composed of the glass B₁ of the Sullivan and Taylor Patent No. 1,304,623 and using a temperature of about 650° C. for the molten salts and a current of about 110 volts D. C., we have carried out the two processes described above thereby changing the composition of the glass as shown by the following analysis:

|  | B₁ | I | II |
|---|---|---|---|
| $SiO_2$ | 80.6 | 76.54 | 72.14 |
| $Na_2O$ | 4.35 | .13 | .43 |
| $K_2O$ | .15 | .14 |  |
| $R_2O_3$ | 2.0 | 1.94 | 2.1 |
| $B_2O_3$ | 12.9 | 12.25 | 11.94 |
| $Cu_2O$ |  | 9.00 |  |
| $Ag_2O$ |  |  | 13.3 |

The glass I was transparent and deep red in color. Its expansion coefficient was .00000172. It could be heated to 800° C. for half an hour without any appreciable change, but at 900 degrees or above its softening point, it devitrified and became opaque, showing that it could not be fabricated by melting a batch of that composition. Its density as measured was .14 higher than the density of the glass B₁ which compares favorably with the density increase of .12 which calculations show would be expected for the replacement of $Na_2O$ with $Cu_2O$, assuming no change in volume. The electrical resistance of this glass is unusually high.

In like manner the alkali of the glass can be substantially completely replaced by another alkali, in which case a low melting salt of the latter is substituted in lieu of the copper chloride in the tube 13. For example, if the process is carried out with the tube 13, a soda glass, filled with potassium nitrate or nitrite or with lithium chloride, the sodium of the glass can be practically entirely replaced by the potassium or the lithium. However, molten alkali salts are more or less corrosive to glass surfaces and we prefer to use a molten mixture of copper chloride containing 10% or more of the desired alkali because we have found that the presence of the copper chloride prevents etching of the glass by the alkali salt. In such a mixture the anions of the two salts should preferably be the same to avoid objectionable fumes, that is, alkali chloride should be added to the copper chloride. Since the alkali metals are more mobile than copper, only the alkali metal can be electrolyzed through the glass from such a mixture. Therefore, in this mixture the copper is not effective except insofar as it prevents etching of the glass surface by the alkali. We are unable to explain this action of copper in preventing etching during electrolysis of glass. It is particularly advantageous in the preparation of photoelectric cells when it is desired to pass an alkali metal into a glass bulb to obtain a thin layer of the metal on the interior surface of the bulb without deterioration of the outer surface.

From the above it will be seen that from a molten mixture of salts containing two or more first group elements, the displacement of the alkali of the glass will be accomplished only by the ions of the more mobile element. The order of mobility of the first group metals corresponds for the more common ones to the order of their atomic weights or atomic numbers and is lithium, sodium, potassium, copper and silver, lithium being the most mobile and silver the least. Therefore, if it is desired to introduce copper into the glass in lieu of the alkali contained therein, the molten salt which constitutes the anolyte and which contains copper ions should be as free as possible from alkali ions because it is believed that any alkali ions which are present in the anolyte will preferentially migrate into the glass.

By means of the above described process, articles can be obtained of glasses having unusual properties that could not be obtained by the usual methods of melting and fabrication. It will be apparent that the current instead of being passed from the inside of the tube 13 to the outside, as described above, may be reversed with equally good results and without departing from the spirit and scope of the invention as claimed. In other words, the molten salt within the tube 13 may constitute either the anolyte or the catholyte as desired. It will further be apparent that, whereas the chief function of the anolyte is to provide ions of the metal which is to enter the glass as well as to impart heat to the glass, the function of the catholyte is merely to receive the alkali ions as they emerge from the glass and hence merely to carry the current as well as to heat the glass. Therefore, the catholyte may consist of any sufficiently low melting salt or mixture of salts which will readily conduct the electric current but will not etch the glass.

While in the foregoing there has been shown and described the preferred embodiment of our invention, it is to be understood that minor changes in the details of construction, combination and arrangement of parts may be resorted to without departing from the spirit and scope of the invention as claimed.

We claim:

1. The method of treating a glass article containing an alkali metal which includes passing a direct electric current through the glass from an electrolyte in contact therewith consisting of a molten inorganic salt containing ions of a metal of the first periodic group other than the alkali metal of the glass, the glass and the salt being heated to a temperature between the strain point and the softening point of the glass whereby the alkali metal of the glass is replaced by the said metal of the first periodic group.

2. The method of treating a glass article containing an alkali metal which includes passing a direct electric current through the glass between electrodes immersed in molten inorganic salts which constitute the anolyte and the catholyte of an electrolytic cell, the anolyte being separated from the catholyte by the glass, the anolyte containing ions of a metal of the first periodic group other than the alkali metal of the glass, the salts and the glass being heated to a temperature between the strain point and the softening point of the glass whereby the alkali metal of the glass is replaced by the said metal of the first periodic group.

3. The method of treating a glass article containing an alkali metal which includes passing a direct electric current through the glass between electrodes immersed in molten inorganic salts which constitute the anolyte and the catholyte of an electrolytic cell, the anolyte being separated from the catholyte by the glass, the anolyte containing copper ions, the salts and the glass being heated to a temperature between the strain point and the softening point of the glass whereby the alkali metal of the glass is replaced by the said metal of the first periodic group.

4. The method of treating a glass article containing an alkali metal which includes passing a direct electric current through the glass between electrodes immersed in molten inorganic salts which constitute the anolyte and the catholyte of an electrolytic cell, the anolyte being separated from the catholyte by the glass, the anolyte containing silver ions, the salts and the glass being heated to a temperature between the strain point and the softening point of the glass whereby the alkali metal of the glass is replaced by the said metal of the first periodic group.

5. The method of treating a glass article containing an alkali metal which includes passing a direct electric current through the glass between electrodes immersed in molten inorganic salts which constitute the anolyte and the catholyte of an electrolytic cell, the anolyte being separated from the catholyte by the glass, the anolyte being a molten mixture containing cuprous chloride and at least 10% of an alkali chloride, the salts and the glass being heated to a temperature between the strain point and the softening point of the glass whereby the alkali metal of the glass is replaced by the said metal of the first periodic group.

6. The method of treating a glass article containing an alkali metal which includes passing a direct current through the glass from an electrolyte in contact therewith, consisting of a mixture of molten salts containing cuprous chloride and at least 10% of an alkali chloride, the glass and the salts being heated to a temperature between the strain point and the softening point of the glass whereby the alkali metal of the glass is replaced by the said metal of the first periodic group.

EDWARD CHARLES LEIBIG.
JAMES FRANKLIN HYDE.